2,989,502
FLAME RESISTANT EPOXY RESINS

Wesley E. Prescott and Wilbur Lee Bressler, Lake Jackson, Tex., assignors to The Dow Chemical Company, Midland, Mich., a corporation of Delaware
No Drawing. Filed Nov. 10, 1958, Ser. No. 772,688
6 Claims. (Cl. 260—47)

This invention relates to improved epoxy resins.

According to the invention, epoxy resins having exceptional flame resistance, high cure rate and short gel time, and useful for fabricating coatings and shaped objects, are made by the reaction of polyglycidyl ethers of polyphenols with an aliphatic polyamine containing a halogenated aromatic nucleus in addition to at least two hydrogen atoms attached to amino nitrogen atoms.

The polyglycidyl ethers useful in practicing the invention are the diglycidyl ethers of aromatic dihydroxy compounds, such as, for instance, resorcinol, hydroquinone, bisphenols, Bisphenol-A (p,p'-isopropylidenediphenol), oxybisphenols, alkylene-bisphenols, and the like and their halogenated analogs.

The amines useful in practicing the invention are the aryl-aliphatic polyamines wherein the amino groups are not more than two carbons removed from a polyhalogenated aromatic nucleus. Such amines have the formula

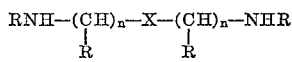

$$\text{RNH}-(\text{CH})_n-\text{X}-(\text{CH})_n-\text{NHR}$$
$$\quad\quad\quad |\quad\quad\quad\quad\quad |$$
$$\quad\quad\quad \text{R}\quad\quad\quad\quad\quad \text{R}$$

wherein each R is hydrogen or a lower alkyl radical and each $n$ is an integer from 1 to 2 and the several R's and n's may be the same or different, and X is a polyhalogenated aromatic nucleus.

By "lower alkyl" we mean alkyl radicals containing 1 to about 4 carbon atoms. By "aromatic nucleus" we mean a bivalent radical containing at least one benzene ring, the two valences being directly attached to aromatic carbon atoms. Thus, the term is inclusive of such radicals as phenylene, biphenylene, oxybisphenyl, methylenebisphenyl, isopropylidenebisphenyl and the like. The aromatic rings of these arylene radicals must contain at least 2, and preferably at least 4 halogen substituents, the preferred halogens being chlorine and bromine.

When diglycidyl ethers of aromatic dihydroxy compounds (diphenols) are cured with diamines of the above-defined type, the rate of reaction, as determined by gel-time and peak exotherm, is much higher than when aromatic polyamines are used as the curing agent. While such reaction rates can be attained by the use of aliphatic polyamines, such as diethylenetriamine, the resulting cured resin does not have the high heat or flame resistance which characterizes the products of the present invention.

The practice of the invention is illustrated by the following example.

Example 1

To illustrate the advantage of the products of the invention over typical products hitherto known in the art, three portions of a high purified sample of diglycidyl ether of Bisphenol-A (epoxy equivalent wt., 173.3) were cured, each with a different amine, as follows.

A. The resin was heated to 95° C., 1.03 equivalents of 2,3,5,6 - tetrachloro - 1,4-bis(aminomethyl)-benzene was added, the mixture was thoroughly agitated for four minutes and then poured into a metal mold. After being left overnight at room temperature the mold was heated for 4.5 hrs. in an oven at 165° C.

B. A second sample was prepared exactly as above except that the amine used was p,p'-methylenedianiline.

C. A third sample was prepared exactly as in A, above, except that the amine was diethylenetriamine and the initial temperature was 25° instead of 95° C.

The peak exotherms and the gel time of the above three resin mixtures were measured, the Castor gelometer being used for the latter measurement.

Several physical properties of the cured resins were determined and are shown in the table below. For the flammability test, the procedure was that of ASTM D–635–44 and the time shown is the number of seconds that the ignited sample burned after the igniting flame was removed. Thus, a time of 0 seconds means that the resin would not support a flame in the absence of a supporting flame.

| Property | Resin | | |
|---|---|---|---|
| | A | B | C |
| Peak Exotherm, ° C | 185 | 128 | 250 |
| Peak Exotherm, Time, Min | 12 | 35 | (a) |
| Gel Time, Min | 11 | 37 | 50 |
| Heat Distortion Point at 264 p.s.i. stress, ° F | 311 | 332 | 160 |
| Izod Impact, ft. lb./in | 0.33 | 0.34 | 0.33 |
| Rockwell Hardness | 105 M | 110 M | 104 M |
| Barcol Hardness | 16 | 30 | 16 |
| Flammability, seconds | 0 | 46 | 120 | a Not determined.

Results similar to those of the above examples are obtained when the procedure and/or reactants are varied within the herein defined scope of the invention. Thus, the temperature at which the reactants are mixed and reacted may be any temperature, below about 100° C., at which the reactants can be properly mixed. Since all the preferred amines are solids at room temperature, they may be melted and stirred into the liquid diglycidyl ether or, if both amine and ether are solids, they may be separately powdered and then mixed in the solid form. This powdered mixture may be stored indefinitely and then cured at will by simply heating to reaction temperature. If the melted mixture is to be stirred, poured, or otherwise extensively handled in the fluid form, its temperature should not exceed about 100° C., otherwise the short gelation time will unduly hamper such handling. On the other hand, if the mixture is simply to be cured without handling, as for instance, when the powdered mixture is simply cured in a mold, the temperature may go considerably higher, even to 200° C. The preferred procedure is to mix the melted reactants at a temperature of about 85–100° C., hold this temperature or permit the heat of reaction to raise it to the exotherm peak until the resin is gelled, and then cure the resin by heating for about 3–5 hours at about 100–200° C.

The ratio of amine to ether should be about 97 to 106 percent of the theoretical equivalent in order to obtain high heat distortion temperatures in the product.

Our new chlorinated amine curing agents will cure any epoxy resin and, when so used, will confer improved heat and flame resistance on the cured resin, as compared to the same resin when cured with conventional curing agents. Thus, while the most heat- and flame-resistance is obtained by use of highly aromatic diglycidyl ethers, a similar improvement in these properties is obtained when the ethers are largely or entirely aliphatic in nature.

While any amine having the formula shown above may be advantageously used, we prefer the tetrahalo-bis-(aminomethyl) benzenes and the alkylidenebis-(aminomethyl-tetrahalobenzenes). Among such are tetrachloro- and tetrabromo-bis(aminomethyl)-benzenes, methylene-bis(aminomethyl - tetrachlorobenzene), isopropylidenebis-(aminoethyl - tetrabromobenzene), isoproplylidenebis-(aminomethyl-dibromobenzene) and the like.

We claim:
1. A resin composition comprising the reaction product of a diglycidyl ether of a diphenol and an amine corresponding to the formula

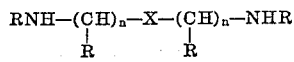

wherein each R is a radical independently selected from the group consisting of hydrogen and lower alkyl radicals, each $n$ is an independently selected integer from 1 to 2 and X is a polyhalogenated aromatic nucleus wherein the halogen is selected from the group consisting of chlorine and bromine.

2. A composition as defined in claim 1, wherein there are about 0.97 to 1.06 equivalents of amine per equivalent of glycidyl ether.

3. A composition as defined in claim 1, wherein each R is H and each $n$ is 1.

4. A composition as defined in claim 1, wherein the amine is 2,3,5,6 - tetrachloro-1,4-bis(aminomethyl)benzene.

5. A resin composition comprising the product produced by the reaction of the diglycidyl ether of p,p'-isopropylidenediphenol with about 0.97 to 1.06 equivalents of 2,3,5,6-tetrachloro-1,4-bis(aminomethyl)benzene.

6. A process for producing an epoxy resin having improved heat and flame resistance comprising heating at about 85–200° C. a mixture of a diglycidyl ether of a diphenol with about 0.97 to 1.06 equivalents of an amine having the formula

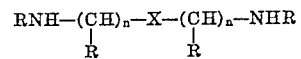

wherein each R is a radical independently selected from the group consisting of hydrogen and lower alkyl groups, each $n$ is an independently selected integer from 1 to 2 and X is a polyhalogenated aromatic nucleus wherein the halogen is selected from the group consisting of chlorine and bromine.

References Cited in the file of this patent
UNITED STATES PATENTS
2,829,164    Rocklin _____ Apr. 1, 1958